United States Patent [19]

Kasai

[11] Patent Number: 4,943,169
[45] Date of Patent: Jul. 24, 1990

[54] THIN TYPE LINEAR MOTION ROLLING GUIDE UNIT WITH APPARATUS FOR PREVENTING DEVIATION OF HOLDER

[75] Inventor: Naomi Kasai, Tokyo, Japan

[73] Assignee: Nippon Thompson Co., Ltd., Tokyo, Japan

[21] Appl. No.: 480,798

[22] Filed: Feb. 16, 1990

[30] Foreign Application Priority Data

Aug. 14, 1989 [JP] Japan .............................. 1-94355[U]

[51] Int. Cl.⁵ .............................................. F16C 29/06
[52] U.S. Cl. ........................................ 384/43; 384/45
[58] Field of Search .................................. 384/43–45

[56] References Cited

U.S. PATENT DOCUMENTS

| | | | |
|---|---|---|---|
| 4,643,591 | 2/1987 | Schwarz | 384/44 |
| 4,647,226 | 3/1987 | Mottate | 384/45 |
| 4,701,057 | 10/1987 | Kashiwabara | 384/45 |
| 4,701,058 | 10/1987 | Mottate | 384/45 |

Primary Examiner—Thomas R. Hannon
Attorney, Agent, or Firm—Rogers & Killeen

[57] ABSTRACT

A thin type linear motion rolling guide unit with a deviation preventing apparatus of a holder mainly comprises: a flat attaching plate having a pinion rod; a U-shaped long bed fixed onto the attaching plate and having horizontal track grooves on opposite inner wall surfaces; an inverse U-shaped long table having outer horizontal track grooves on the outer wall surfaces, the table being slidably inserted in an inner cavity of the bed with gaps; and a U-shaped long holder arranged between the bed and the table. First and second pinions having the same tooth shape and a gear ratio of 1:2 area formed in the upper portion of the pinion rod so as to penetrate the bottom wall of the bed and a long hole formed in the holder and to project therefrom. A J-shaped second rack member is attached to the inner wall surface of the table. A rack surface is formed on the inner wall surface of the second rack member in engagement with the teeth of the second pinion. The rack surface is formed on the edge surface of the shelf-shaped portion on the side of the curved portion of the J-shaped second rack member. A wedge slit extending in the longitudinal direction in parallel with the rack surface is formed in the shelf-shaped portion, thereby applying the elastic deforming characteristics in the lateral direction to the shelf-shaped portion with the rack surface.

12 Claims, 5 Drawing Sheets

THIN TYPE LINEAR MOTION ROLLING GUIDE UNIT WITH APPARATUS FOR PREVENTING DEVIATION OF HOLDER

BACKGROUND OF THE INVENTION

1. Field of the Invention

The present invention relates to the improvement of a thin type linear motion rolling guide unit according to Japanese Patent Application No. 1-116060.

2. Description of the Related Background Art

A linear motion rolling guide unit of the invention disclosed in the above patent application comprises: a long bed member having a U-shaped cross section which is fixedly attached onto a flat plate-shaped attaching member; a long table member which is assembled with the bed member through rolling members; and a rolling member holder which holds a number of rolling members and is arranged between the bed member and the table member, wherein a first rack surface extending in the longitudinal direction is formed on the bottom wall of the holder, a second rack surface is formed on the inner surface of the long table member, when first and second pinions are simultaneously rotated at different peripheral speeds on a common shaft which is come into engagement with each of the rack surfaces and is perpendicularly fixed onto the surface of the attaching member, the engagement conditions between the racks and the pinions are not changed for a change in radial load which is applied to the unit upon operation, the shape of the holder is easily set to a thin shape, the pinion shaft itself is used as a drive shaft of the table, and thereby miniaturizing the whole unit.

However, according to the construction of the unit of the above patent application, since no pressurizing apparatus exists between the second rack of the second rack member and the second pinion, there are problems such that looseness (or play) easily occurs in the engagement portion of the gear and a slight slide phenomenon occurs between the rolling members such as balls and each track surface.

Further, the noises also increase due to the occurrence of the looseness and the unit is abraded early, resulting in an early damage of the unit.

SUMMARY OF THE INVENTION

It is, therefore, an object of the present invention to provide a thin type linear motion rolling guide unit in which by forming a second rack member into a special shape, a pressure is applied to the engagement surface between a second pinion and the rack surface of the second rack member which is formed on a pinion rod, and a table member can be accurately moved in response to the rotation of the pinion rod, so that the above problems can be eliminated.

According to the invention, the above object is accomplished by a thin type linear motion rolling guide unit with an apparatus for preventing a deviation of a holder, comprising:

a flat plate-shaped attaching member (1) having a pinion rod (11) which rotatably penetrates and extends the attaching member (1) in the vertical direction;

a long bed member (2) having a U-shaped cross section which is fixedly attached onto the upper surface of the attaching member (1) and has inner horizontal track grooves (21) for rolling members (5) on opposite inner wall surfaces of the bed member (2);

a long table member (3) having an inverse U-shaped cross section which has outer horizontal track grooves (31) for the rolling members (5) on outer wall surfaces of the table member (3) at the positions which face the inner horizontal track grooves (21) of the bed member (2) and is inserted into an inner cavity (20) of the bed member (2) so as to be away from the opposite inner wall surfaces of the bed member (2) with gaps and to be slidable in the longitudinal directin; and a long holder (4) having a U-shaped cross section which is arranged between the inner wall surfaces of the bed member (2) and the opposite inner wall surfaces of the table member (3), wherein a number of rolling member holding holes (41) for rotatably holding a number of rolling members (5) at regular intervals in horizontal lines between both of the opposite track grooves of the bed member (2) and of the table member (3) are formed in opposite walls of the holder (4), a center long hole (42) which extends in the longitudinal direction is formed in the bottom wall of the holder (4), a first rack (43) is formed on an edge surface of one side of the center long hole (42), the upper portion of the pinion rod (11) is formed with a first pinion (12) and a second pinion (14) which penetrate the bottom wall of the bed member (2) and the long hole (42) of the holder (4) and are projected from the long hole (42) and are come into engagement with the first rack (43), the first and second pinions (12, 14) are adjacently concentrically fitted and fixedly attached to the upper portion of the pinion rod (11), a second rack member (32) having an almost J-shaped cross section which extends in the longitudinal direction is attached to the inner wall surface of the apex portion of the table member (3), a rack surface (33) is formed on the inner wall surface of the second rack member (32), in a state in which the second rack member (32) is attached to the inner wall surface of the table member (3), the rack surface (33) is come into engagement with the tooth train of the second pinion (14), the teeth of the first and second pinions (12, 14) have a same shape, the number of teeth of the second pinion (14) is set to be twice as large as the number of teeth of the first pinion (12), the rack surface (33) of the second rack member (32) is formed on the edge surface of an edge shelf-shaped portion (35) on the side of a curved portion (34) of the J-shaped cross-sectional shape of the second rack member (32), and a slit (38) having a wedge-shaped cross section which extends substantially in parallel with the rack surface (33) in the longitudinal direction is formed in the shelf-shaped portion formed with the rack surface, thereby applying elastic deforming characteristics in the lateral direction to the shelf-shaped portion (35) formed with the rack surface.

According to another aspect of the invention, the above object is accomplished by a thin type linear motion rolling guide unit with an apparatus for preventing a deviation of a holder, comprising:

a flat plate-shaped attaching member (1) having a pinion rod (11) which rotatably penetrates and extends the attaching member (1) in the vertical direction;

a long bed member (2) having a U-shaped cross section which is fixedly attached onto the upper surface of the attaching member (1) and has inner horizontal track grooves (21) for rolling members (5) on opposite inner wall surfaces of the bed member (2);

a long table member (3) having an inverse U-shaped cross section which has outer horizontal track grooves (31) for the rolling members (5) on outer wall surfaces of the table member (3) at the positions which face the inner horizontal track grooves (21) of the bed member (2) and is inserted into an inner cavity (20) of the bed member (2) so as to be away from the opposite inner wall surfaces of the bed member (2) with gaps and to be slidable in the longitudinal direction; and a long holder (4) having a U-shaped cross section which is arranged between the inner wall surfaces of the bed member (2) and the opposite inner wall surfaces of the table member (3), wherein a number of rolling member holding holes (41) for rotatably holding a number of rolling members (5) at regular intervals in horizontal lines between both of the opposite track grooves of the bed member (2) and of the table member (3) are formed in opposite walls of the holder (4), a center long hole (42) which extends in the longitudinal direction is formed in the bottom wall of the holder (4), a first rack (43) is formed on an edge surface of one side of the center long hole (42), the upper portion of the pinion rod (11) is formed with a first pinion (12) and a second pinion (14) which penetrate the bottom wall of the bed member (2) and the long hole (42) of the holder (4) and are projected from the long hole (42) and are come into engagement with the first rack (43), the first and second pinions (12, 14) are adjacently concentrically fitted and fixedly attached to the upper portion of the pinion rod (11), a second rack member (32) having an almost J-shaped cross section which extends in the longitudinal direction is attached to the inner wall surface of the apex portion of the table member (3), a rack surface (33) is formed on the inner wall surfaces of the second rack member (32), in a state in which the second rack member (32) is attached to the inner wall surface of the table member (3), the rack surface (33) is come into engagement with the tooth train of the second pinion (14), the teeth of the first and second pinions (12, 14) have a same shape, the number of teeth of the second pinion (14) is set to be twice as large as the number of teeth of the first pinion (12), the rack surface (33) of the second rack member (32) is formed on the edge surface of an edge shelf-shaped portion (35) on the side of a curved portion (34) of the J-shaped cross-sectional shape of the second rack member (32), and a slit (38') having an elliptical cross section and a major axis which extends in parallel with the rack surface (33) in the longitudinal direction is formed in the shelf-shaped portion (35) formed with the rack surface, thereby applying elastic deforming characteristics in the lateral direction to the shelf-shaped portion (35) formed with the rack surface.

An elliptical slit having a wedge-shaped cross section of having a major axis in the longitudinal direction is formed in the rack surface forming shelf-shaped portion of the second rack member so as to be substantially parallel or in parallel with the rack surface, thereby giving elastic deforming characteristics in the lateral direction to the shelf-shaped portion and providing a pressure to the second pinion which is come into engagement with the rack surface.

The above and other objects and features of the present invention will become apparent from the following detailed description and the appended claims with reference to the accompanying drawings.

BRIEF DESCRIPTION OF THE DRAWINGS

FIGS. 4-1 and 4-2 are perspective views of second rack members which are used in the embodiment;

FIG. 4-1 shows a structure having a wedge-shaped slit;

FIG. 4-2 is a modification of FIG. 4-1 and shows a structure having an elliptical slit.

DETAILED DESCRIPTION OF THE PREFERRED EMBODIMENTS

An embodiment of the invention is shown in FIGS. 1 to 5.

Figure 1:
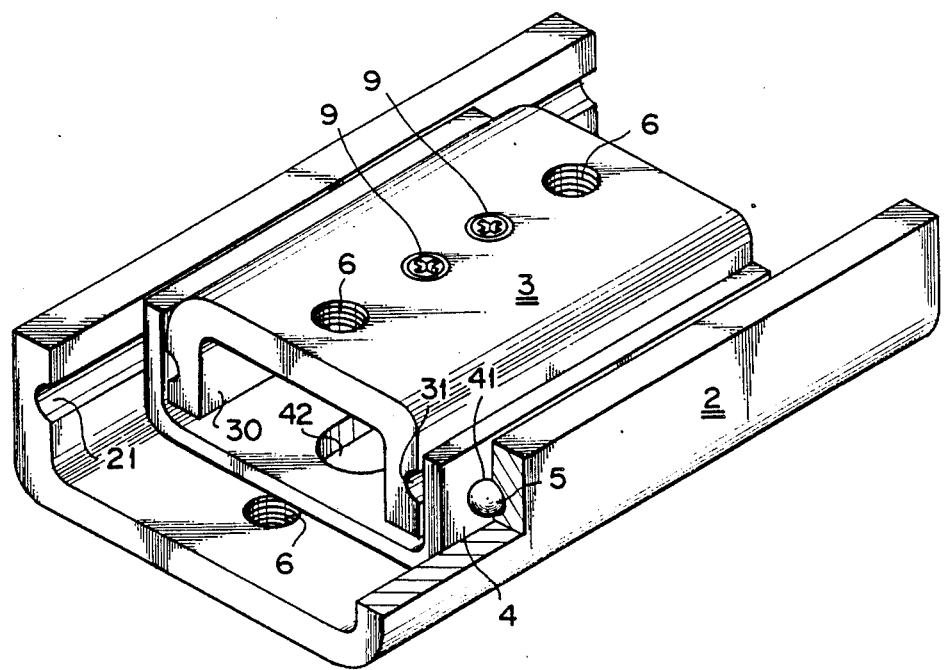
FIG. 1 is a perspective view with a part cut away showing an embodiment of the invention.

FIG. 1 is a perspective view showing the embodiment of a thin type linear motion rolling guide unit according to the invention. The unit of the invention has substantially the same construction as the thin type linear motion rolling guide unit of Japanese Patent Application No. 1-116060 mentioned above except the structure of the second rack member.

In a manner similar to the conventional invention, balls 5 as rolling members, a long bed member 2 a long table member 3, and the like are made of an ordinary stainless steel, the other parts and members are made of plastics, preferably, abrasion resistance plastics, the whole size of the unit is small, and almost of those parts are so small that can be put on the hand.

As is clearly illustrated in FIG. 1, the bed member 2 has a U-shaped cross section and extends in the longitudinal direction. A pair of horizontal track grooves 21 for rolling the balls 5 are formed on opposite inner wall surfaces of the bed member 2 at proper height positions so as to face each other. A rectangular tub-shaped inner cavity portion 20 extending in the longitudinal direction is formed by the opposite inner wall surfaces of the bed member 2.

Figure 2:
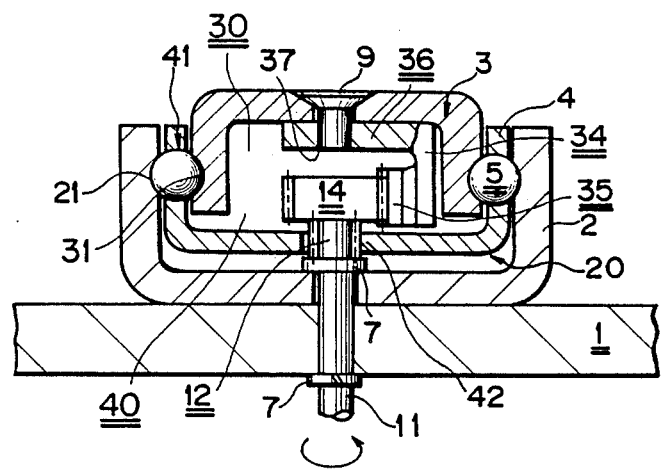
FIG. 2 is a cross-sectional view of the embodiment shown in FIG. 1.

FIG. 2 shows a cross-sectional view of the invention shown in FIG. 1. The bed member 2 is fixedly attached onto the upper surface of a flat plate-shaped attaching member 1 by fixing devices through attaching holes 6 (FIG. 1) which are formed in both of the bed member 2 and the table member 3. A pinion rod 11 whose one end is coupled with a proper rotating drive mechanism rotatably vertically penetrates the attaching member 1 and bed member 2 which are fixedly attached in the vertical direction. That is, the pinion rod 11 can be freely rotated by rotation drive means (not shown) provided below the attaching member 1.

The table member 3 shown in FIGS. 1 and 2 is enclosed in the inner cavity 20 of the bed member 2 so as to be away from the opposite inner wall surfaces and to be slidable in the longitudinal direction. The table member 3 has an inverse U-shaped cross-sectional shape and extends in the longitudinal direction. A pair of horizontal track grooves 31 for balls are formed on opposite outer wall surfaces of the table member 3 at the corresponding positions which face the horizontal track grooves 21 of the bed member 2.

Figure 3:
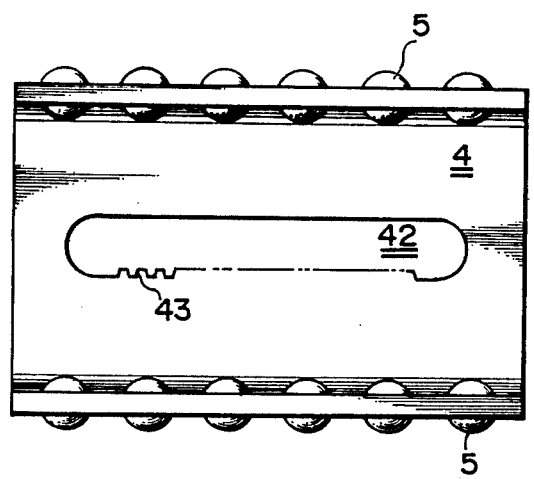
FIG. 3 is a plan view of a ball holder which is used in the embodiment of the invention.

A ball holder 4 having a U-shaped cross-sectional shape as shown in FIG. 3 is arranged in the gap portions formed between the bed member 2 and the table member 3 and holds the table member 3 in an inner cavity portion 40 of the ball holder 4 so as to sandwich the table member 3. On the other hand, the bed member 2 and the ball holder 4 are arranged so that their bottom walls face each other. A number of ball holding holes 41 are formed in a horizontal line in each of the opposite walls of the ball holder 4 at desired intervals. The bed member 2 and table member 3 are assembled with the balls 5 held in the holes 41. The balls 5 held by the holder 4 are rotatably sandwiched between each horizontal track groove 21 formed on the inner wall surface of the bed member 2 and each horizontal track groove 31 formed on the outer wall surface of the table member 3.

In the embodiment, a number of balls 5 have been held as rolling members in the holder 4 and a rolling guide unit has been constructed between the table member 3 and the bed member 2. However, if the holding holes of the holder 4 and the track grooves on the table side and bed side are formed in proper shapes, rollers can be also used as rolling members. In such a case, the similar effect is also obtained.

FIG. 2 is a cross-sectional view of FIG. 1. In the construction of the first embodiment of the invention, the bed member 2 having a U-shaped cross section is fixedly mounted onto the upper surface of the flat plate-shaped attaching member 1. The table member 3 having an inverse U-shaped cross section is fitted into the inner cavity 20 of the bed member 2 so as to be relatively slidable through a number of balls 5 held by the long holder 4 having a U-shaped cross section. The pinion rod 11 is vertically rotatably penetrated in the attaching member 1. In the upper portion of the pinion rod 11, the rod 11 penetrates the central portion in the transversal direction of the bed member 2 and, further, a center long hole 42 of the holder 4 which opens just over the center portion of the bed member 2. In this way, the upper portion of the pinion rod 11 is projected and extended over the hole 42. As mentioned above, the lower end portion of the pinion rod 11 is coupled to rotation drive means such as an electric motor or the like (not shown).

Figure 5:
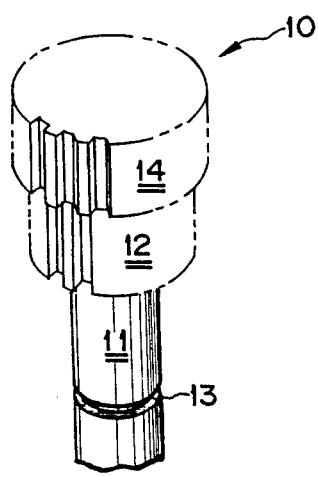
FIG. 5 is a schematic perspective view of a pinion assembly 10.

As shown in FIG. 5, a diameter of the upper portion of the pinion rod 11 is increased at a position corresponding to the center long hole 42 of the holder 4, thereby forming a first pinion 12. Further, a diameter of the upper apex portion adjacent to the first pinion of the pinion rod 11 is increased, thereby forming a second pinion 14. A pinion assembly 10 is constructed by the pinion rod 11, first pinion 12, and second pinion 14.

The first pinion 12 is come into engagement with a first rack 43 formed along the edge on one side of the center long hole 42 of the holder 4 shown in FIG. 3. As will be explained hereinlater, the second pinion 14 is come into engagement with a rack 33 of a second rack member 32 which is attached to an inner cavity 30 of the table member 3. Washer grooves 13 are formed on the outer peripheral surfaces of the pinion rod 11 at positions below the first pinion 12. Washers 7 are fitted into the washer grooves 13. The interval between the outer bottom wall of the holder 4 and the inner bottom wall of the bed member 2 and the position in the axial direction of the pinion rod can be properly adjusted by the washers 7. Other well-known technical equivalents means can be also used in place of the washers.

With the construction as mentioned above, by rotating the pinion rod 11 penetrating the attaching member 1, the first and second pinions 12 and 14 are rotated. The first pinion 12 slides in the longitudinal direction the first rack 43 formed in the long hole 42 of the holder 4 which is come into engagement with the first pinion 12. The second pinion 14 slides in the longitudinal direction the second rack 33 which is come into engagement with the second pinion 14. Thus, the finite rectilinear motion of the table member 3 to the bed member 2 is executed. The ball holder 4 arranged between the bed member 2 and the table member 3 through the balls 5 can prevent any shift movement to both members due to the engagement between the first pinion 12 and the first rack 43.

The invention is characterised by a special structure of the second rack member 32 which provides the second rack and it will be explained hereinbelow with reference to FIGS. 2, 4-1, and 4-2.

Figures 1, 4:
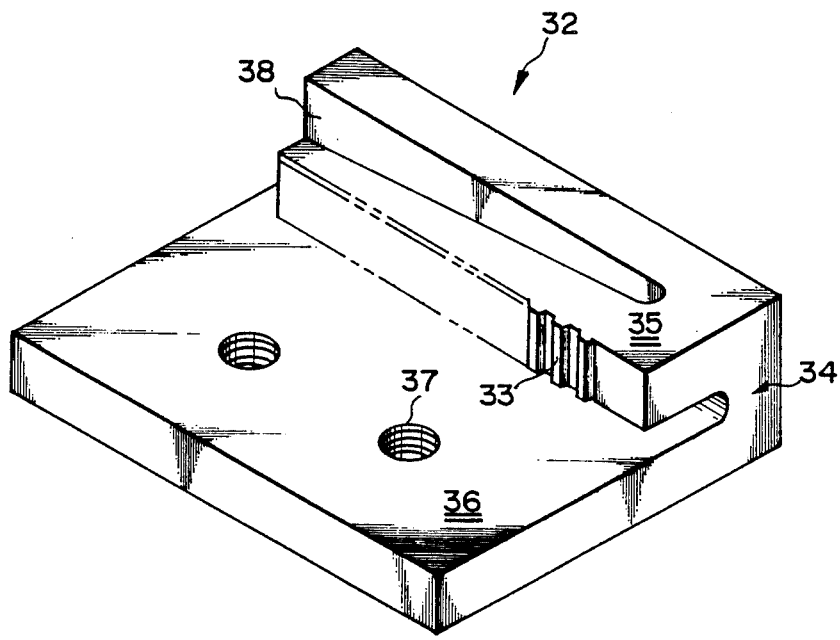
Figures 2, 4:
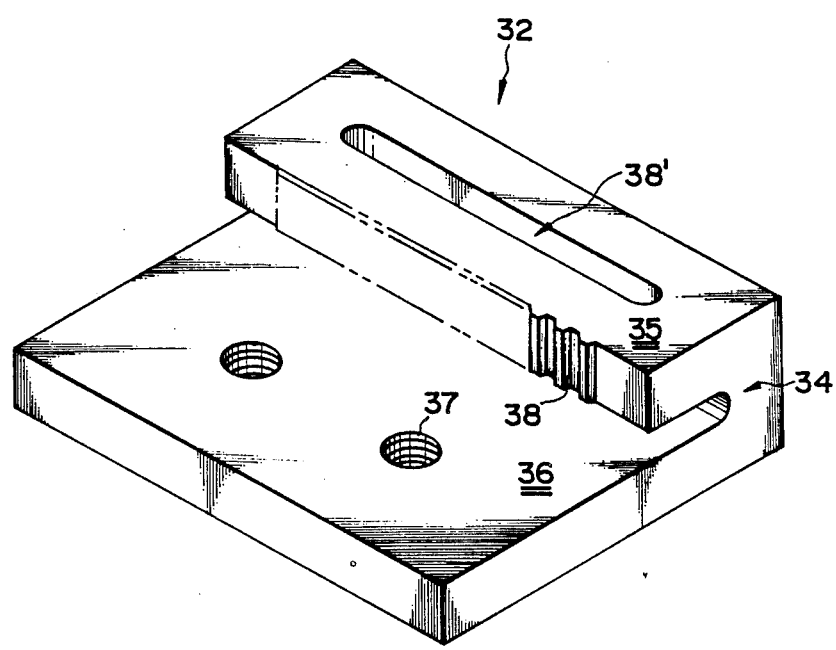

As shown in FIGS. 4-1 and 4-2, the long second rack member 32 in the invention has a J-shaped cross section and comprises: a curved portion 34; a shelf-shaped portion 35 having a short lateral width which is coupled integrally with the curved portion 34 and extends in parallel in the same direction at an equal interval; and a base plate portion 36 having a long lateral width. The second rack is formed on the front edge surface of the shelf-shaped portion 35. The outer surface of the base plate portion 36 is fixedly attached to the inner wall surface of the apex of the table member in a cantilever manner by a plurality of attaching holes 37 formed in the base plate portion 36.

As shown in FIG. 2, the second rack member 32 attached to the inner surface of the table member 3 has a J-shaped cross section. Therefore, the second rack 33 formed at the edge of the shelf-shaped portion 35 is brought to the aligned engagement position of the tooth train of the adjacent second pinion 14.

As shown in FIGS. 4-1 and 4-2, according to the invention, a wedge-shaped slit 38 (in the case of the first embodiment shown in FIG. 4-1) or a slit 38' (in the case of the second embodiment shown in FIG. 4-2) which is elliptical in the longitudinal direction is formed in the shelf-shaped portion 35 so as to be in parallel with or almost in parallel with the second rack surface 33 formed on the edge surface of the shelf-shaped portion 35, thereby increasing the elastic deforming performance in the lateral direction of the shelf-shaped portion 35. Due to this, a pressure is applied between the tooth train of the second pinion 14 and the second rack surface 33 and is held, thereby providing the stable certain rack driving operation (FIG. 2).

With the above construction, as shown in FIG. 5, by setting the diameter of the second pinion 14 to be larger than the diameter of the first pinion 12, the peripheral rotational speed of the second pinion is changed with respect to the peripheral rotational speed of the first pinion. For instance, the number of teeth of the second pinion is set to be twice as large as that of the first pinion and their tooth shapes are equalized. Thus, the ratio of the moving distances of the holder 4 and table member 3 due to the rotation of the pinion rod 11 is set to 1:2 by the second rack which is come into engagement with the second pinion. Thus, the abnormal deviation of the holder 4 in association with the movement of the table member 3 is prevented.

The ratio of the moving distances of the table member 3 and holder 4 can be also changed by properly changing the gear ratio between the first and second pinions to a desired integer number.

As will be obvious from a plan view of FIG. 3 showing the holder 4 in detail, the ball holder 4 has the size in the axial direction corresponding to the length of the longitudinal axis of the table member 3. The tooth train of the first rack 43 formed along the edge on one side of the long hole 42 extending in the axial direction at the central position in the width direction of the holder 4 is come into engagement with the first pinion 12 formed in the upper portion of the pinion rod 11. Thus, the holder 4 is reciprocated in the axial direction in accordance with the rotation of the pinion rod 11. A number of ball holding holes 41 are symmetrically horizontally formed at regular intervals in the opposite side walls of the holder 4 having the U-shaped cross section at the opposite positions. Therefore, the balls 5 are rotatably held in the track grooves 21 and 31 of the bed member 2 and table member 3, respectively (FIG. 2), thereby allowing the relative free movement in the axial direction of both members 2 and 3.

As will be obvious from FIG. 2, the ball holder 4 is positioned to the bed and table members 2 and 3 by the balls 5. The holder 4 itself is held in a contactless manner from the bed and table members through the balls, thereby reducing the frictional resistance by the holder.

The teeth of the rack of the second rack member 32 having the J-shaped cross section which is formed on the inner wall of the inner cavity 30 of the table member 3 so as to be extent in the longitudinal direction in a cantilever manner are formed in the same shape and at the same pitch as those of the teeth of the second pinion 14. Therefore, in association with the rotation of the second pinion 14, the table member 3 is reciprocated in the longitudinal axial direction with respect to the bed member 2 through the second rack member 32.

In the construction of the embodiment, the table member 3 and second rack member 32 have been separately constructed. However, they can be also integrally constructed.

On the other hand, when the second rack member 32 is fixed to the surface of the inner cavity portion 30 of the table member, by forming the attaching holes 37 of the base plate portion so as to be elliptical in the direction perpendicular to the sliding direction of the table member 3, a pressure which is applied between the second pinion 14 and the second rack surface 33 upon attaching can be largely adjusted.

FIG. 5 is a perspective view of the pinion assembly 10 which is constructed by forming the first and second pinions 12 and 14 to the pinion rod 11 shown in the cross-sectional view of FIG. 2. Actually, it is also possible to construct the integrated pinion rod by forming the first and second pinions by increasing the diameter of the upper portion of the pinion rod 11 to two large values.

In the example shown in FIG. 5, the teeth of the cylindrical first pinion 12 having the small diameter at the lower stage in the upper portion of the pinion rod 11 and the teeth of the cylindrical second pinion 14 having the large diameter at the upper stage have the same pitch. The number of teeth of the first pinion is the half of that of the second pinion. Therefore, the ratio of the moving distances of the table member 3 and ball holder 4 by one rotation of the pinion rod 11 is always set to 2:1, thereby enabling the positional deviation of the holder 4 to be prevented.

As described in detail above, the present invention relates to the improvement of the thin type linear motion rolling guide unit of Japanese Patent Application No. 1-116060 as a conventional invention. In a compact rational combination of the pinion gear mechanism and the rack mechanism, the deviation of the ball holder in the operation can be prefectly prevented. The small high accurate linear motion rolling guide unit mechanism is realized. Further, the structure of the second rack member which is come into engagement with the second pinion is deformed by applying a pressure, thereby eliminating the play in the engagement driving of the rack mechanism and the slide motion between the track surfaces. The generation of the noises during the operation and the early abrasion are eliminated. Practically speaking, the elastic deformation amount of the second rack to the load can be increased. Even if an attaching error between the rack and pinion mechanisms is large, it is absorbed and the smooth slide motion can be provided. On the other hand, by forming the slit in the second rack member, a pressure can be applied to the second rack and the second pinion. Therefore, the regular slide motion with little slide abrasion can be performed. Further, according to the present invention, by merely modifying a part of the component members of the unit disclosed in Japanese Patent Application No. 1-116060, the maximum effect is accomplished and the unit of the present invention can be cheaply manufactured.

The present invention is not limited to the foregoing embodiments but many modifications and variations are possible within the spirit and scope of the appended claims of the invention.

What is claimed is:

1. A thin type linear motion rolling guide unit with an apparatus for preventing a deviation of a holder, comprising:

a flat plate-shaped attaching member (1) having a pinion rod (11) which rotatably penetrates and extends the attaching member (1) in the vertical direction;

a long bed member (2) having a U-shaped cross section which is fixedly attached onto the upper surface of the attaching member (1) and has inner horizontal track grooves (21) for rolling members (5) on opposite inner wall surfaces of the bed member (2);

a long table member (3) having an inverse U-shaped cross section which has outer horizontal track grooves (31) for the rolling members (5) on outer wall surfaces of the table member (3) at the positions which face the inner horizontal track grooves (21) of the bed member (2) and is inserted into an inner cavity (20) of the bed member (2) so as to be away from the opposite inner wall surfaces of the bed member (2) with gaps and to be slidable in the longitudinal direction; and a long holder (4) having a U-shaped cross section which is arranged between the inner wall surfaces of the bed member (2) and the opposite inner wall surfaces of the table member (3), wherein a number of rolling member holding holes (41) for rotatably holding a number of rolling members (5) at regular intervals in horizontal lines between both of the opposite track grooves of the bed member (2) and of the table member (3) are formed in opposite walls of the holder (4), a center long hole (42) which extends in the longitudinal direction is formed in the bottom wall of the holder (4), a first rack (43) is formed on an edge surface of one side of the center long hole (42), the upper portion of the pinion rod (11) is formed with a first pinion (12) and a second pinion (14) which penetrate the bottom wall of the bed member (2) and the long hole (42) of the holder (4) and are projected from the long hole (42) and are come into engagement with the first rack (43), the first and second pinions (12, 14) are adjacently concentrically fitted and fixedly attached to the upper portion of the pinion rod (11), a second rack member (32) having an almost J-shaped cross section which extends in the longitudinal direction is attached to the inner wall surface of the apex portion of the table member (3), a rack surface (33) is formed on the inner wall surface of the second rack member (32), in a state in which the second rack member (32) is attached to the inner wall surface of the table member (3), the rack surface (33) is come into engagement with the tooth train of the second pinion (14), the teeth of the first and second pinions (12, 14) have a same shape, the number of teeth of the second pinion (14) is set to be twice as large as the number of teeth of the first pinion (12), the rack surface (33) of the second rack member (32) is formed on the edge surface of an edge·shelf-shaped portion (35) on the side a curved portion (34) of the J-shaped cross-sectional shape of the second rack member (32), and a slit (38) having a wedge-shaped cross section which extends substantially in parallel with the rack surface (33) in the longitudinal direction is formed in the shelf-shaped portion formed with the rack surface, thereby applying elastic deforming characteristics in the lateral direction to the shelf-shaped portion (35) formed with the rack surface.

2. A unit according to claim 1, wherein one end of the pinion rod (11) is coupled with rotating drive means.

3. A unit according to claim 2, wherein balls are used as the rolling members.

4. A unit according to claim 2, wherein rollers are used as the rolling members.

5. A unit according to claim 1, wherein balls are used as the rolling members.

6. A unit according to claim 1, wherein rollers are used as the rolling members.

7. A thin type linear motion rolling guide unit with an apparatus for preventing a deviation of a holder, comprising:
a flat plate-shaped attaching member (1) having a pinion rod (11) which rotatably penetrates and extends the attaching member (1) in the vertical direction;
a long bed member (2) having a U-shaped cross section which is fixedly attached onto the upper surface of the attaching member (1) and has inner horizontal track grooves (21) for rolling members (5) on opposite inner wall surfaces of the bed member (2);
a long table member (3) having an inverse U-shaped cross section which has outer horizontal track grooves (31) for the rolling members (5) on outer wall surfaces of the table member (3) at the positions which face the inner horizontal track grooves (21) of the bed member (2) and is inserted into an inner cavity (20) of the bed member (2) so as to be away from the opposite inner wall surfaces of the bed member (2) with gaps and to be slidable in the longitudinal direction; and a long holder (4) having a U-shaped cross section which is arranged between the inner wall surfaces of the bed member (2) and the opposite inner wall surfaces of the table member (3), wherein a number of rolling member holding holes (41) for rotatably holding a number of rolling members (5) at regular intervals in horizontal lines between both of the opposite track grooves of the bed member (2) and of the table member (3) are formed in opposite walls of the holder (4), a center long hole (42) which extends in the longitudinal direction is formed in the bottom wall of the holder (4), a first rack (43) is formed on an edge surface of one side of the center long hole (42), the upper portion of the pinion rod (11) is formed with a first pinion (12) and a second pinion (14) which penetrate the bottom wall of the bed member (2) and the long hole (42) of the holder (4) and are projected from the long hole (42) and are come into engagement with the first rack (43), the first and second pinions (12, 14) are adjacently concentrically fitted and fixedly attached to the upper portion of the pinion rod (11), a second rack member (32) having an almost J-shaped cross section which extends in the longitudinal direction is attached to the inner wall surface of the apex portion of the table member (3), a rack surface (33) is formed on the inner wall surface of the second rack member (32), in a state in which the second rack member (32) is attached to the inner wall surface of the table member (3), the rack surface (33) is come into engagement with the tooth train of the second pinion (14), the teeth of the first and second pinions (12, 14) have a same shape, the number of teeth of the second pinion (14) is set to be twice as large as the number of teeth of the first pinion (12), the rack surface (33) of the second rack member (32) is formed on the edge surface of an edge shelf-shaped portion (35) on the side of a curved portion (34) of the J-shaped cross-sectional shape of the second rack member (32), and a slit (38') having an elliptical cross section and a major axis which extends in parallel with the rack surface (33) in the longitudinal direction is formed in the shelf-shaped portion (35) formed with the rack surface, thereby applying elastic deforming characteristics in the lateral direction to the shelf-shaped portion (35) formed with the rack surface.

8. A unit according to claim 7, wherein one end of the pinion rod (11) is coupled with rotating drive means.

9. A unit according to claim 8, wherein balls are used as the rolling members.

10. A unit according to claim 8, wherein rollers are used as the rolling members.

11. A unit according to claim 7, wherein balls are used as the rolling members.

12. A unit according to claim 7, wherein rollers are used as the rolling members.

* * * * *